United States Patent [19]

Savage

[11] Patent Number: 5,720,656

[45] Date of Patent: Feb. 24, 1998

[54] AIRCRAFT AIR CONDITIONING HOSE

[76] Inventor: Brian T. Savage, 71 Dartmouth St., Valley Stream, N.Y. 11581

[21] Appl. No.: 543,629

[22] Filed: Oct. 16, 1995

[51] Int. Cl.[6] ............................................. B64D 13/00
[52] U.S. Cl. ......................... 454/119; 138/121; 138/172; 285/226; 454/903
[58] Field of Search .................... 454/76, 77, 119, 454/903; 138/119, 121, 173, 118, 172, 106; 285/226, 227

[56] References Cited

U.S. PATENT DOCUMENTS

| 2,708,867 | 3/1955 | Turner, Jr. .................... 454/119 |
| 2,894,535 | 7/1959 | Hansen ......................... 138/121 |
| 3,640,312 | 2/1972 | Bauman et al. ................. 138/121 |
| 4,526,090 | 7/1985 | Maier ........................... 454/119 |

FOREIGN PATENT DOCUMENTS

| 52-31417 | 3/1977 | Japan ........................... 454/119 |
| 560270 | 3/1944 | United Kingdom .................. 138/121 |

*Primary Examiner*—Harold Joyce
*Attorney, Agent, or Firm*—Myron Amer P.C.

[57] ABSTRACT

A hose for an aircraft parked at a remote location from a source of pre-conditioned air through which the pre-conditioned air, under pressure, is delivered through the hose, wherein the hose construction uses to advantage a length portion having a bellows, in that the bellows folds are constrained by an internal strap from longitudinal expansion and thus are not "blown out" by the pressure air and yet, retain degrees of rotation and contraction.

2 Claims, 1 Drawing Sheet

AIRCRAFT AIR CONDITIONING HOSE

The present invention relates generally to an improved hose for servicing a parked aircraft with air conditioning from a remote source, the improvements more particularly obviating any kinking as might occlude the hose despite its length required to reach a distanced air conditioning source and size differences in the aircraft being serviced, both of which have heretofore made the delivery of air conditioning to parked aircraft difficult.

EXAMPLE OF THE PRIOR ART

During flight the engine(s) of the aircraft supplies the air conditioning, but when parked, the aircraft is more economically and more safely supplied with air conditioning from an outside source. If the outside source is mobile, such as the wheeled ventilating unit 10 of U.S. Pat. No. 4,632,019 issued to Gary D. Whiteman for "Airplane Airconditioner" on Dec. 30, 1986, the close proximity of the source and aircraft readily permits the air conditioning servicing of the aircraft to be achieved without mishap, particularly if the delivery of the air conditioned air is via a hose with a bellows configuration, such as the Whiteman hose or ducting 32 and 34.

In other circumstances however, as when the air conditioning source is not mobile and thus the reach of the hose must be many yards, and a variety of different aircraft are to be serviced with correspondingly different heights above ground of the aircraft air conditioning inlet connection, these and other such variables impose bending and twisting articulation in the hose that often causes kinking, and thus occluding, in the hose which, as should be readily appreciated, interferes with the air conditioning delivered to the aircraft.

Broadly, it is an object of the present invention to provide from a distanced air conditioning source a hose connection to a parked aircraft overcoming the foregoing and other shortcomings of the prior art.

More particularly, it is an object to embody the hose connection with a bellows configuration that is rendered unaffected by the flow of high pressure air tending to blow out the folds of the bellows, so that it remains in tact to permit twisting and bending in the hose without kinking, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a front elevational view illustrating in partial perspective an aircraft depicted in a parked condition at an airport and having connected thereto a hose through which there is delivered air conditioned air under pressure to the aircraft, said hose being illustrative of prior art construction;

FIGS. 2, 3 and 4, respectively, are similarly front elevational views of aircraft and hose as depicted in FIG. 1, wherein there is illustrated the effect of height differences above ground of an aircraft on the operating condition of said prior art hose;

Figure 1:
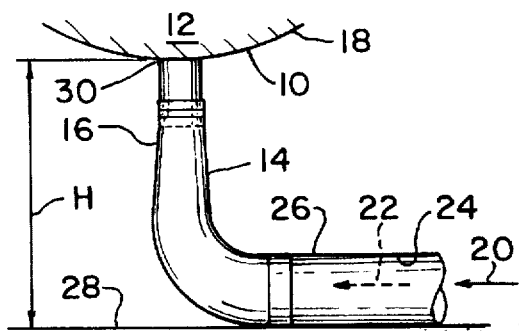

For well understood reasons of cost and safety, it is currently the practice to avoid the main engine use of a parked aircraft, the "belly" of which is denoted by the reference 10, to air condition the aircraft interior 12, and instead to employ for this end use a hose 14 with an opposite proximate end (not shown) and distal end 16 connected at its distal end 16 in spanning relation between the aircraft 18 and at its proximal end to a source 20 of air conditioned air 22 supplied under a pressure typically in the range of 80–100 psi through a passageway 24 bounded by the cylindral wall 26 of the hose 14.

The prior art construction of the hose 14 at its aircraft-attached distal end 16 is typically merely of a flat or planar embodiment, as depicted in FIG. 1, and is of an appropriately selected length in its run from the pressure air conditioning source 20 to the aircraft 18 so as to assume a smooth curvature from the ground 28 and through the height H to the aircraft connection established at 30. Nevertheless, and as depicted in FIG. 2, even with the same aircraft 18 with the same "belly" height H, if the interfitting connecting means 32 typically achieved in rotational relation by cooperating collar means or the like, are inadvertently out of register with each other, this out of register connection correspondingly produces twists 34 in the hose 14 which occludes the passageway 24 and thus blocks free passage of the air conditioned air 22 being delivered from the duct 38 connected to the source 20.

Assuming even an ideal in-register aircraft connection 30, i.e. standard coupling sleeve 40 and conventional collar 42 are secured in longitudinal alignment with each other by strap 44, use of the prior art hose 14 with aircrafts with a smaller belly height H—(FIG. 3) or a larger belly height H+ (FIG. 4) will on occasion assume kink(s) 46 due to cramping (FIG. 3) or due to lifting (FIG. 4) in the critical hose distal end 16 which will occlude the hose passageway 24 and diminish air conditioning flow to the aircraft.

Figure 5:
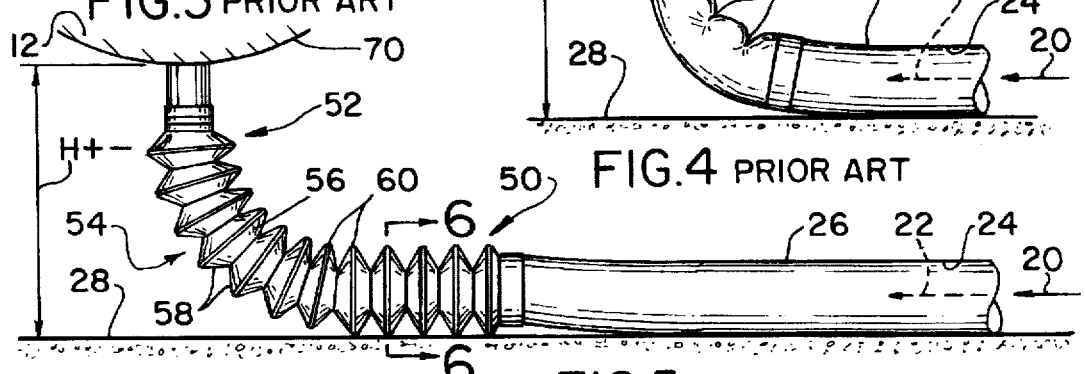
FIG. 5 is still another front elevational view of an aircraft and connected hose as depicted in FIG. 1, but illustrating the improved construction of the within inventive hose and the condition resulting therefrom for obviating the shortcomings of FIGS. 2-4.
Figure 7:
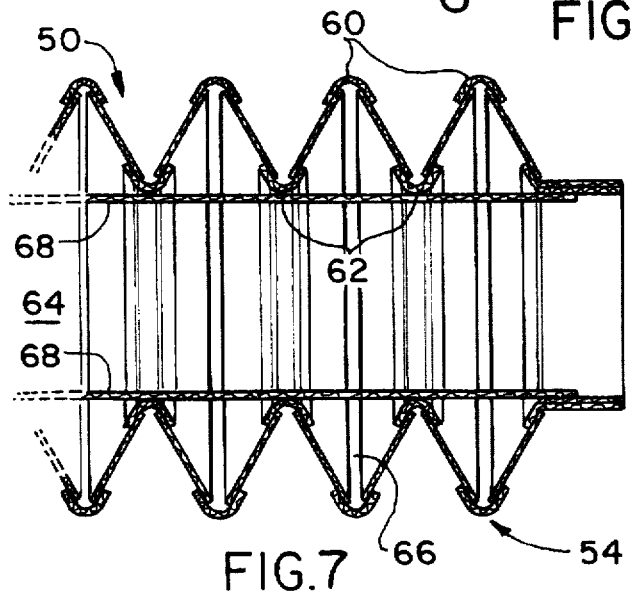
FIG. 7 is another detail sectional view of said bellows configuration as taken along line 7—7 of FIG. 6.
Figure 6:
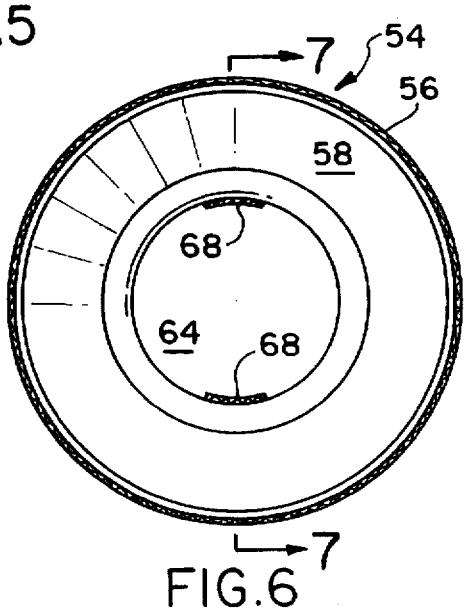
FIG. 6 is an isolated sectional view, on an enlarged scale, of the inventive hose of FIG. 5 as taken along line 6—6 of FIG. 5 showing structural details of the bellows configuration thereof.

In FIGS. 5–7, the within inventive hose 50 includes in its aircraft-attached distal end 52 a length portion comprised of a bellows configuration, generally designated 54, constructed, as is well known, with a cylindral wall 56 configurated in alternately angularly oriented components, individually and collectively designated 58, respectively presenting external and internal cusps 60 and 62 at changes of angular direction by which, also as is well known, the bellows configuration readily partakes, without kinking, of rotational and length-shortening and length-elongating degrees of movement.

Figure 2:
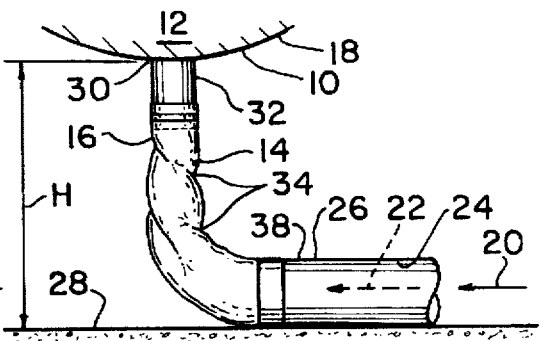
Figure 3:
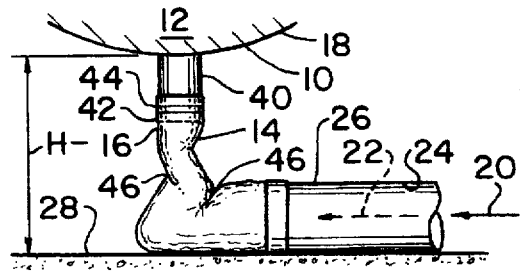
Figure 4:
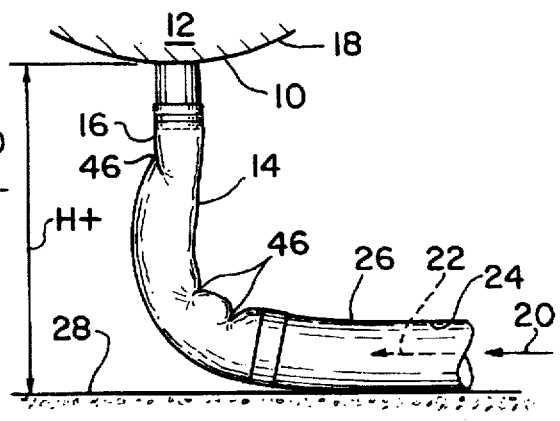

To enable advantageous use to be made of this noted operating mode of the bellows 54, and underlying the present invention, is the recognition that in the delivery of the pressure air through the passageway 64 there is a tendency of the pressure air to "blow out" the folds 66 of the bellows causing it to assume a planar nature which, as explained in connection with FIGS. 2-4, is a hose condition vulnerable to kinking. To counteract this "blow out" possibility, the bellows length-elongating degree of movement is constrained using at least one, and preferable two straps 68 which are each successively connected, by stitching, adhesion or other appropriate means, in spanning relation across adjacently located of the internal cusps 62 so as to extend lengthwise of the bellows configuration 54. The folds 66 of the bellows are thusly constrained against "blow out" by the straps 68 and being thusly in their necessary configuration to partake of rotational and shortening degrees of movement have been found in practice to effectively obviate kinking of the hose distal end 52, irrespective of the differences of the belly height H± of the aircraft being serviced with air conditioned air.

It is to be noted that the dispensed with length-elongating degree of movement of the bellows configuration is of no adverse consequence because the length of the bellows configuration is selected to accommodate the largest anticipated belly height H+ so that outfitting the hose 50 to an aircraft 70 with a belly height H+ does not occasion any lifting in the bellows configuration as epicted in FIG. 4.

While the apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. For an aircraft parked at a remote location from a source producing air conditioned air under pressure, a hose of a type having opposite proximal and distal ends connected in spanning relation between said aircraft and said pressure air source and bounding an internal passageway required to be unoccluded by kinks during the use thereof, improvements in said hose comprising a hose length portion having a bellows configuration in the distal end thereof connected to said aircraft, said bellow configuration having wall means characterized by alternately angularly oriented construction presenting external and internal cusps at changes of angular direction operatively effective to have rotational and length-shortening and length-elongating degrees of movement, and at least one strap means connected successively to each internal cusp such that said strap is in a taut condition in spanning relation across said adjacently located of said internal cusps lengthwise of said bellows configuration so as to be operatively effective to permit said rotational and length-shortening degrees of movement therein and to curtail said length-elongating degree of movement, whereby lengthening of said bellows configuration into a flat configuration by said pressure air being delivered there through as might have a tendency to kink is obviated while said bellows configuration still having said permitted rotational and length-shortening degrees of movement is operatively effective to undergo twisting and assumption of small radius bends without kinking.

2. The improved air conditioned air delivery hose of claim 1 wherein said strap means is comprised of two straps disposed along opposite sides of said bellows configuration.

* * * * *